Feb. 4, 1969  J. CLARK  3,425,614
APPARATUS FOR ALIGNING PIPE ENDS
Filed May 19, 1967  Sheet 1 of 2
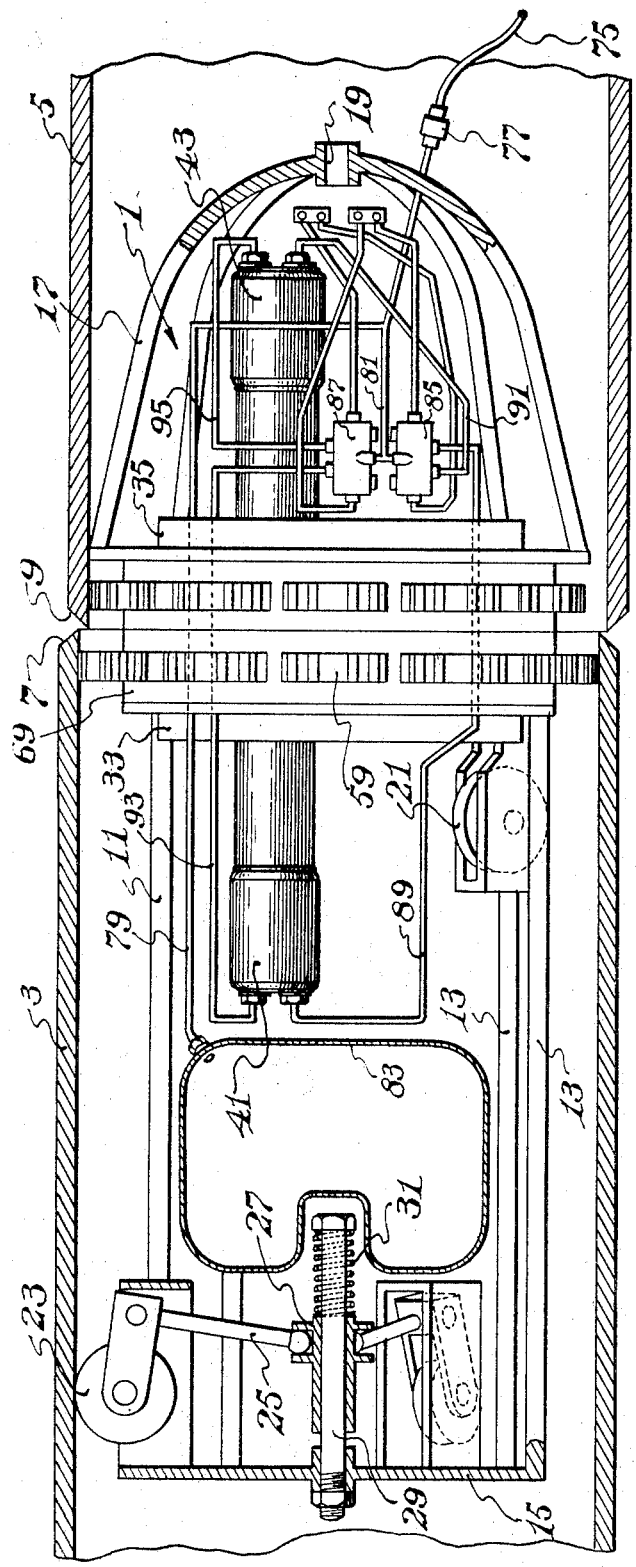
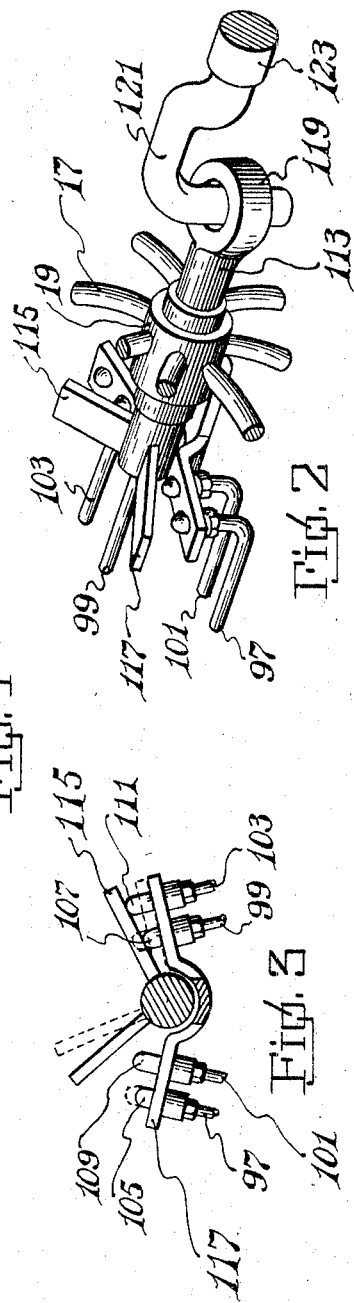
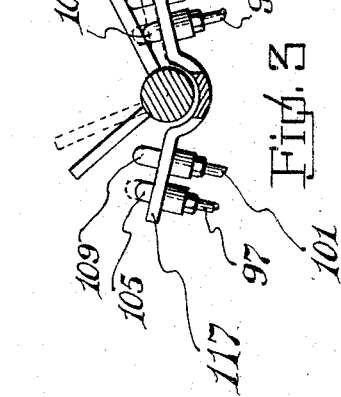
INVENTOR.
Julius Clark
BY
Young & Thompson
ATTORNEYS Feb. 4, 1969 J. CLARK 3,425,614
APPARATUS FOR ALIGNING PIPE ENDS
Filed May 19, 1967 Sheet 2 of 2

INVENTOR.
Julius Clark
BY
Young & Thompson
ATTORNEYS

United States Patent Office 3,425,614
Patented Feb. 4, 1969

3,425,614
APPARATUS FOR ALIGNING PIPE ENDS
Julius Clark, 313 W. Boston Ave.,
Broken Arrow, Okla. 74012
Filed May 19, 1967, Ser. No. 639,875
U.S. Cl. 228—49              12 Claims
Int. Cl. B23k 37/04

ABSTRACT OF THE DISCLOSURE

A lineup clamp for welding pipeline sections, in which an air motor drives gearing which simultaneously drives a plurality of radially arranged screws having nuts thereon that are the lineup shoes. There are plural easily replaceable rollers on the shoes. The air motors are selectively operable in forward or reverse by rotation of the same handle that pulls the lineup clamp through the pipeline.

---

The present invention relates to apparatus for aligning pipe ends, and more particularly for aligning in closely contiguous relationship the ends of a plurality of end-to-end pipe sections.

In the construction of pipelines, a plurality of pipe sections are laid end-to-end, each successive section being butt welded to the immediately preceding section. In order to form a suitable base for the weld so that a fluid-tight connection will result, it is obvious that the pipe sections must be not only coaxial but also closely contiguous entirely about the peripheries of the adjacent ends of the sections to be welded together. Now, the large diameter pipe sections often used for pipeline construction are not precisely cylindrical even as manufactured; and during transportation to the job site and as a result of rough handling upon arrival, the pipe sections and more particularly the ends thereof often lose their circular contour.

Thus, it very often happens that when a pipe section is laid up endwise against its preceding section, the adjacent ends will be out of true to the point that it is useless to attempt a weld. Therefore, it is the usual practice to run a greatly enlarged mandrel into the line to align the ends to be welded together. These devices are known as "lineup clamps" and function in the manner of welding jigs or fixtures not only to align the parts prior to welding but to maintain them in aligned position during welding.

Such lineup clamps have long been known to the art; but the ones known heretofore have suffered from a great many disadvantages. For example, lineup clamps as proposed heretofore have not been able, within the confined space afforded by the interior of a pipeline, to exert sufficiently great pressure upon the adjacent ends to deform them into congruity. Also, certain prior lineup clamps tended to exert components of axial force upon one or another of the pipe sections to be welded together, with the result that the adjacent ends were either moved apart or rammed together. Moreover, the lineup clamps known to the prior art could not readily be deactivated for movement to the next forward weld, could not be easily manipulated from a distance the length of a pipe section, were expensive to build, costly to maintain and difficult to operate.

Although a number of attempts were made to overcome the foregoing and other disadvantages of the prior art, none, as far as is known, was entirely successful when carried out commercially on an industrial scale.

Accordingly, it is an object of the present invention to provide apparatus for aligning pipe ends which will exert extremely strong aligning forces from within a pipeline.

Another object of the present invention is the provision of apparatus for aligning pipe ends which will exert no substantial component of force axially of the pipe sections.

The invention also contemplates the provision of apparatus for aligning pipe ends which may be quickly and easily disengaged for ready movement to adjacent a new weld.

Yet another object of the present invention is the provision of apparatus for aligning pipe ends which will be extremely compact in construction and which will exert a steady and dependable aligning force of constant magnitude.

A still further object of the present invention is the provision of apparatus for aligning pipe ends which may be readily operated from a distance at least the length of a pipe section of a pipeline.

Finally, the present invention has as its object to provide apparatus for aligning pipe ends which will be relatively inexpensive to manufacture, easy to position, operate, maintain and repair, and rugged and durable in use.

Other objects and advantages of the present invention will become apparent from a consideration of the following description taken in conjunction with the accompanying drawings in which:

FIG. 1 is a side elevational view, with parts broken away, of apparatus for aligning pipe ends according to the present invention, in position in a pipeline at the time that the succeeding pipe section has been emplaced but not aligned;

FIG. 2 is a fragmentary perspective view of the draft mechanism and motor operating mechanism;

FIG. 3 is a cross-sectional view of the structure shown in FIG. 2;

Figure 4:
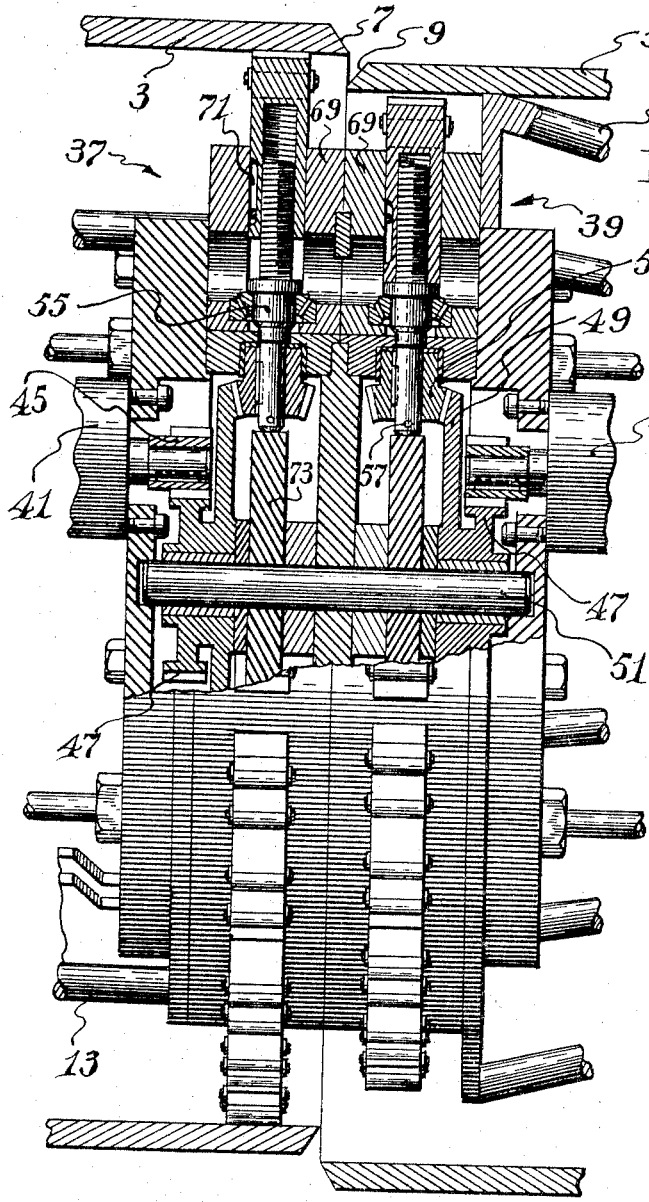
FIG. 4 is an enlarged fragmentary side view, with parts broken away, showing the alignment mechanism of the present invention.
Figure 5:
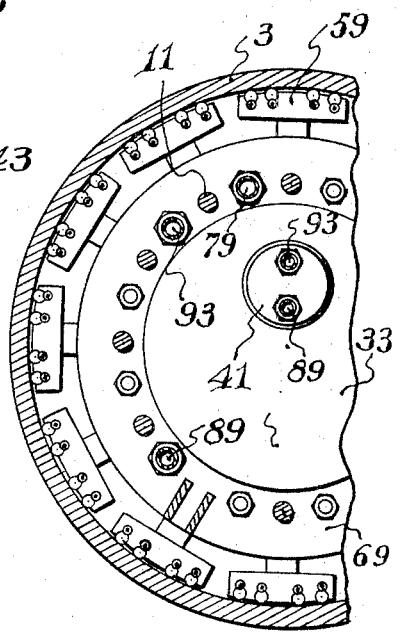
FIG. 5 is a fragmentary cross-sectional view with parts broken away of the device of the present invention.

Referring now to the drawings in greater detail, there is shown apparatus for aligning pipe ends, indicated generally at 1, disposed in a pair of end-to-end pipe sections 3 and 5 having their contiguous ends 7 and 9 beveled for the reception of weld metal.

The lineup clamp of the present invention comprises a frame 11 made up of a number of bars 13 that extend lengthwise of the frame and are interconnected at their rear ends by a plate 15. The forward end of frame 11 is comprised of a number of curved rods 17 that are interconnected at their forward ends by a sleeve 19. Supports for the frame 11 are provided, in the form of a pair of rollers 21 disposed intermediate the length of the frame for rotation about fixed axes, and three equally distantly spaced rollers 23 mounted on crank arms 25 whose inner ends bear against a sleeve 27 that slides on a shaft 29 secured to rear plate 15 and disposed axially of frame 11. A coil compression spring 31 continuously urges sleeve 27 to the rear thereby continuously yieldably urging rollers 23 outwardly with equal pressure into engagement with pipe section 3 thereby to maintain the lineup clamp centered in the pipeline within a wide range of sizes of pipe.

Referring now to FIG. 4, the operating mechanism of the present invention will be described. Intermediate the length of frame 11 are disposed two circular plates 33 and 35 which are perpendicular to the axis of the lineup clamp and which are the principal portions of the housing for the mechanism. In general, the mechanism between the plates 33 and 35 is duplicated on opposite sides of a plane perpendicular to the axis of the lineup clamp, the mechanism to the rear of that plane being operative in connection with the pipe end 7 previously emplaced and the mechanism to the front of that plane being operative in connection with the newly emplaced pipe end 9. Accordingly, the rear mechanism will be referred hereinafter as mechanism 37; while the forward mechanism will be referred as mechanism 39. Also, it will suffice to describe only one of these mechanisms in detail, as the two mechanisms are mirror images of each other on opposite sides of that plane of symmetry.

Mounted on plate 33 for the operation of mechanism 37 is an air motor 41; while mounted on plate 35 for the operation of mechanism 39 is an air motor 43. Each air motor is of the rotary type and drives a pinion gear 45 keyed to its drive shaft. Gear 45 in turn meshes with a gear 47 that bears a substantially larger miter gear 49. The gear units 47, 49 are coaxial with the lineup clamp and with each other and are rotatable on a center idler shaft 51 that is carried between plates 33 and 35.

Miter gear 49 meshes with a plurality of relatively small miter gears 53 that are spaced equal distances peripherally about the lineup clamp and that are keyed each to a radially extending shaft 55. Relative axial movement between gears 53 and shafts 55 is restrained on the one hand by the housing of the mechanism and on the other hand by pins 57 passing through shafts 55.

Figure 7:
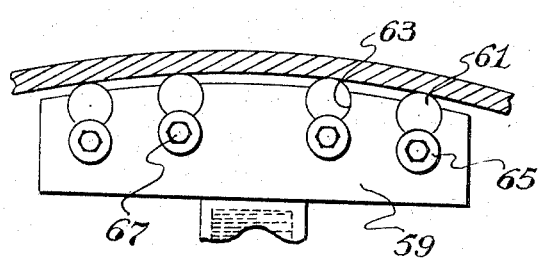
FIG. 7 is a front elevational view of the shoe of FIG. 6 in position.
Figure 6:
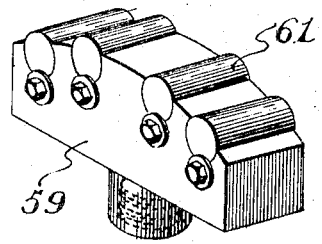
FIG. 6 is an enlarged perspective view of an alignment shoe of the present invention.

At their outer ends, shafts 55 are screw threaded and are in screw threaded engagement each with an internally screw threaded shoe 59 best seen in FIGS. 6 and 7. Each shoe 59 has a generally arcuate outer face of about the same radius of curvature of the pipeline in question. The working surfaces of the shoes 59, however, are constituted by a plurality of cylindrical rollers 61 whose axes are parallel to that of the lineup clamp. Each roller 61 is disposed in and projects beyond a part-cylindrical recess 63 whose periphery occupies more than 180° but less than 360° of arc.

The rollers 61 are freely rotatable in recesses 63 and are of about the same length as the width of the associated shoe 59. They are retained in their recesses 63 against axial movement relative to shoe 59 by means of washers 65 that are pressed against the forward and rear surfaces of shoes 59 by means of screws 67. To replace a worn roller 61, it is necessary only to loosen and remove the associated screw 67 and washer 65, after which the roller 61 can simply be slid axially out of its recess 63 and replaced. Needless to say, the thrust of washers 65 is borne by the side surfaces of shoes 59 and not by the ends of rollers 61, so as to permit rollers 61 to rotate freely in their recesses 63.

The shoes 59 slide radially in peripheral rings 69 that complete the mechanism housing. Inside, the housing is filled with oil for lubrication, and of course appropriate seals (not shown) are provided for the casing joints and for the shanks of the shoes that extend through the casing. The shoes 59 are keyed at 71 to these rings 69 to prevent rotation of the shoes and to confine the movement of the shoes to radial movement despite the rotation of shafts 55. The thrust or reaction of the shoes on the shafts 55 is borne at the radially inner end of the shoes by circular thrust plates 73 that are also traversed by shaft 51. Of course, as the action of shafts 55 on thrust plates 73 is radial only, and as this action is preferably evenly balanced entirely about the periphery of thrust plates 73, the thrust plates 73 do not need to rotate on shaft 51 and ideally do not impose any radial thrust on shaft 51.

The air motors 41 and 43 are selectively individually drivable in forward or reverse. In the following discussion, "forward" rotation will be the direction of rotation that moves shoes 59 radially outward and "reverse" rotation will be the direction that moves shoes 59 radially inward, thereby respectively to expand or retract the shoes.

Air under pressure for the operation of the motors is brought from a source of supply (not shown) through a flexible conduit 75 past an air check valve 77 to branch conduits 79 and 81. Conduit 79 leads to an air tank 83 in which is maintained a supply of air under pressure for the steady operation of the motors. Conduit 81 leads in parallel to a pair of air transfer valves 85 and 87. The valves 85 and 87 may be of the spool type or other conventional construction which need not be illustrated in detail. The valve 85 controls the forward or expanding movement of the motors while the valve 87 controls the reverse or retracting movement of the motors. A conduit 89 for the forward rotation of motor 41 extends from valve 85 to motor 41. A conduit 91 for the forward rotation of motor 43 extends from valve 85 to motor 43. A conduit 93 for the reverse rotation of motor 41 extends from valve 87 to motor 41; while a conduit 95 for the reverse rotation of motor 43 extends from valve 87 to motor 43. Control conduits 97, 99, 101 and 103 actuate the valves 85 and 87 to supply air under pressure to conduits 89, 91, 93 and 95 respectively. Push button valves 105, 107, 109 and 111, disposed in pairs on opposite sides of the axis of the lineup clamp and closely adjacent the sleeve 19, control the conduits 97, 99, 101 and 103, respectively.

To operate these push button valves, a shaft 113 extends through sleeve 19 and terminates rearwardly in a pair of blades 115 and 117 disposed of at an obtuse angle to each other. At its front end, shaft 113 terminates in an eye 119 in which is removably disposed a hook 121 at the rear end of the handle 123 by which the lineup clamp is pulled through the pipeline by appropriate draft means (not shown).

In operation, the lineup clamp 1 is dragged through the pipe section 3 until it occupies the position shown in FIG. 1. Pipe section 5 is not yet in place, so that the controls are accessible to an operator standing in the trench. The operator then manually depresses the push button of the valve 105, whereupon air under pressure is sent through conduit 89 to operate air motor 41 in the forward direction. The gearing 45–53 is actuated to rotate all of the shafts 55 of the mechanism 37 in a direction to extend all of the rear shoes 59 simultaneously and to the same extent, so that they move out in an expanding circle to the position shown in FIG. 1, thereby forcing the associated pipe end 7 into a true circular configuration. The rollers 61 ensure that the only components of force exerted against the pipe end will be radial, so that the hoop stresses will be uniform. At this time, the mechanism 39 remains inactive and the associated shoes 59 remain in their radially inner position as shown in FIGS. 1 and 4.

The draft and air lines are then run through the pipe section 45, which is positioned as in FIGS. 1 and 4, with the contiguous ends 7 and 9 of the sections 3 and 5 as close to each other as possible. The controls are now inaccessible to the operator, because they are deep within pipe section 5. So the handle 123 is rotated clockwise as seen in FIGS. 2 and 3 for a distance only sufficient to depress the push button of valve 107. Air under pressure is thus sent through conduit 91 to motor 43 in a direction to drive motor 43 forward to expand the shoes 59 of the forward mechanism 39. The forward shoes 59 then move radially outwardly to a position where they describe a circle exactly congruent to and coaxial with the circle described by the periphery of the rear shoes 59. The contiguous ends 7 and 9 of the pipe sections are thus brought into exact registry entirely about their periphery; and with the parts in this position the weld is formed entirely about the joint. Once the weld has cooled, the forward and rear shoes are collapsed. This is done by rotating the handle 123 farther clockwise as seen in FIGS. 2 and 3, until the push button of valve 111 is depressed whereupon air under pressure is sent through conduit 95 to the motor 43 to drive it in the reverse direction to retract the forward shoes 59, it being noted that the valve 111 takes precedence over the valve 107: in other words, when blade 115 is in the phantom line position of FIG. 3 and depresses the push buttons of both of the valves 107 and 111, the air motor 43 operates in a reverse direction to retract the shoes. The handle 123 is then turned counterclockwise as seen in FIGS. 2 and 3 until blade 117 depresses the push button of valve 109, thereby to reverse the operation of the motor 41 and retract the rear shoes 59. Of course it will be understood that the order in which the shoes are retracted can be reversed.

With all the shoes retracted, the lineup clamp now rests on rollers 21 and is then pulled forward until it occupies in the newly added pipe section 5 the same position in which it is shown in the pipe section 3 in FIGS. 1 and 4. The operation is then repeated with a further added pipe section, and so on until the pipeline is completed.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for aligning contiguous ends of a plurality of end-to-end pipe sections, comprising a plurality of shoes arranged in a circle, and means for moving said shoes simultaneously selectively radially inwardly and outwardly, said moving means comprising radially extending screws in screw-threaded engagement with the shoes, and power means for simultaneously rotating the screws.

2. Apparatus as claimed in claim 1, there being two sets of said shoes arranged in two concentric circles that are axially spaced apart, and means for selectively individually operating either of said sets of shoes.

3. Apparatus as claimed in claim 1, said power means comprising a fluid motor of the rotary type, and gear means driven by said motor and driving said screws.

4. Apparatus as claimed in claim 1, and a stationary backup member against which the radially inner ends of said screws abut.

5. Apparatus as claimed in claim 1, and means fixing said shoes against rotation about the axes of the screws.

6. Apparatus as claimed in claim 1, each said shoe having on its outer periphery a plurality of rollers whose axes are parallel to each other and to the axis of the circle described by the shoes.

7. Apparatus as claimed in claim 6, said rollers projecting radially outwardly from the periphery of the associated shoe and being disposed in recesses in the periphery of the associated shoe, said recesses having a peripheral extent greater than 180° but less than 360° of arc.

8. Apparatus as claimed in claim 7, said recesses extending through at least one side of the shoe, and removable lock means extending across at least a portion of the opening of the recess through the side of the shoe thereby releasably to retain a roller in the recess.

9. Apparatus as claimed in claim 1, and draft means for dragging said apparatus through a pipe section, and control means for said power means, said control means being actuatable by rotation of said draft means.

10. Apparatus as claimed in claim 9, said draft means being rotatable in one direction to effect one movement of at least some of said shoes and in the other direction to effect another movement of at least some of said shoes.

11. Apparatus for aligning contiguous ends of a plurality of end-to-end pipe sections, comprising a plurality of shoes arranged in a circle, means for moving said shoes simultaneously selectively radially inwardly and outwardly, at least three rollers spaced apart peripherally of the apparatus for centering the apparatus in the pipe sections, and means common to all said rollers for conjointly urging all of said rollers radially outwardly into contact with the interior walls of the pipe sections whereby the pressure with which the rollers are urged against the interior walls of the pipe sections is equal for all the rollers.

12. Apparatus as claimed in claim 11, said rollers being mounted on the radially outer ends of first-class levers, and means continuously yieldably bearing against the radially inner ends of said levers with a force whose direction is coaxial with said circle of shoes.

References Cited

UNITED STATES PATENTS 2,635,573  4/1953  Taylor.

RICHARD H. EANES, Jr., *Primary Examiner.*